US010000306B2

(12) United States Patent
Klem

(10) Patent No.: US 10,000,306 B2
(45) Date of Patent: Jun. 19, 2018

(54) VARIABLE VOLUME CONTAINERS USEFUL IN PACK-OFF OPERATIONS

(71) Applicant: Brian Klem, Coppell, TX (US)

(72) Inventor: Brian Klem, Coppell, TX (US)

( * ) Notice: Subject to any disclaimer, the term of this patent is extended or adjusted under 35 U.S.C. 154(b) by 11 days.

(21) Appl. No.: 14/709,836

(22) Filed: May 12, 2015

(65) Prior Publication Data
US 2016/0059984 A1    Mar. 3, 2016

Related U.S. Application Data

(63) Continuation of application No. PCT/US2013/069560, filed on Nov. 12, 2013.

(60) Provisional application No. 61/725,425, filed on Nov. 12, 2012.

(51) Int. Cl.
| | |
|---|---|
| *B65G 1/06* | (2006.01) |
| *B65G 1/07* | (2006.01) |
| *D06F 95/00* | (2006.01) |
| *B65B 67/02* | (2006.01) |
| *B65B 35/04* | (2006.01) |
| *B65D 21/08* | (2006.01) |
| *B65G 29/00* | (2006.01) |
| *B65G 37/00* | (2006.01) |

(52) U.S. Cl.
CPC ............. *B65B 67/02* (2013.01); *B65B 35/04* (2013.01); *B65D 21/08* (2013.01); *B65G 29/00* (2013.01); *B65G 37/00* (2013.01); *B65B 2220/16* (2013.01)

(58) Field of Classification Search
CPC ........................... B65B 25/046; D06F 95/006
USPC .............. 220/4.04; 248/125.7, 125.8, 346.2, 248/346.3, 349.1; 294/77; 414/416.09, 414/924, 925, 930; 53/245, 255, 390, 53/469, 473
See application file for complete search history.

(56) References Cited

U.S. PATENT DOCUMENTS

| | | | | |
|---|---|---|---|---|
| 1,932,527 A | * | 10/1933 | Long .................. | B01D 11/0269 210/237 |
| 1,987,916 A | * | 1/1935 | Thompson ............ | B65B 25/046 193/7 |
| 2,038,993 A | * | 4/1936 | Erlanger ............... | D06F 95/006 210/237 |
| 2,039,024 A | * | 4/1936 | Otis ....................... | D06F 49/003 210/237 |
| 2,065,978 A | * | 12/1936 | Krantz .................... | D06F 95/00 210/232 |
| 2,285,547 A | * | 6/1942 | Whelan ................. | D06F 95/006 210/237 |

(Continued)

FOREIGN PATENT DOCUMENTS

| | | |
|---|---|---|
| JP | 63-176210 | 7/1988 |
| JP | 2004-210458 | 7/2004 |

*Primary Examiner* — Gregory W Adams
(74) *Attorney, Agent, or Firm* — Woodard, Emhardt, Moriarty, McNett & Henry, LLP

(57) ABSTRACT

Disclosed are container apparatuses that have variable volume capacity, which are useful, for example, as pack-off containers in operations involving manufactured articles. The container apparatuses can have vertically translatable bottom members to adjust volume capacity, and the bottom members can also be rotatable to facilitate the presentation of manufactured articles for removal. The vertically translatable bottom members can be suspended flexible sheet materials, portions of which can be raised or lowered to re-contour the shape of and adjust the volume capacity of the container apparatuses.

29 Claims, 11 Drawing Sheets

(56) References Cited

U.S. PATENT DOCUMENTS

| | | | | |
|---|---|---|---|---|
| 2,767,536 A | * | 10/1956 | Forkel | B65H 67/066 |
| | | | | 198/382 |
| 2,921,702 A | * | 1/1960 | Gross | B65B 23/02 |
| | | | | 414/416.09 |
| 3,007,584 A | * | 11/1961 | Way | A47B 49/00 |
| | | | | 220/628 |
| 3,788,480 A | * | 1/1974 | Rousselet | B04B 11/04 |
| | | | | 210/237 |
| 4,104,156 A | | 8/1978 | Fletcher | |
| 4,318,511 A | | 3/1982 | Clark | |
| 4,815,258 A | * | 3/1989 | Jesperson | B65B 39/007 |
| | | | | 53/245 |
| 5,502,949 A | * | 4/1996 | Main | B65B 25/046 |
| | | | | 53/245 |
| 5,549,342 A | * | 8/1996 | Donaldson | B66C 1/127 |
| | | | | 294/68.1 |
| 6,508,045 B2 | | 1/2003 | Kim | |

* cited by examiner

VARIABLE VOLUME CONTAINERS USEFUL IN PACK-OFF OPERATIONS

CROSS-REFERENCE TO RELATED APPLICATIONS

This application is a continuation of International Application No. PCT/US2013/069560, filed Nov. 12, 2013, which claims the benefit of U.S. Provisional Application No. 61/725,425, filed Nov. 12, 2012, both of which are incorporated herein in their entirety.

BACKGROUND

The present invention relates generally to containers, and in particular aspects to containers useful to receive manufactured articles and which have the capacity to vary their volume to accommodate more or fewer of the manufactured articles.

In high-volume manufacturing of commercial goods, such as bagged snack foods, the completed articles must be drawn off the manufacturing line and packed into shipping containers, such as boxes, as efficiently as possible. Heretofore, such manufactured articles have been conveyed with a conveyor onto a "pack-off" table, which is rotating. Packing personnel positioned around the table remove the manufactured items as the table rotates, and manually pack them into the shipping containers.

At times, the rate at which the manufactured articles are conveyed onto the pack-off table exceeds the capacity of the packing personnel to remove and pack them. In such cases, it becomes necessary to slow or shut down the conveyor dispensing the manufactured articles onto the pack-off table. This in turn can disrupt the manufacturing line and reduce the output of the manufacturing facility.

In light of this background, needs remain for improved and/or alternative apparatuses and methods for handling manufactured articles as they come off the line. In certain aspects, the present invention is addressed to these needs.

SUMMARY

In one embodiment, provided is a rotating pack-off container for receiving manufactured articles. The container includes a circumferential frame and a container bottom wall supported in association with the circumferential frame. The container bottom wall is arranged to support manufactured articles when residing in the container, and the container bottom wall is translatable vertically to vary the volume capacity of the container. A drive mechanism is provided, and is arranged to rotate the container bottom wall so as to rotate manufactured articles when supported on the bottom wall. The container bottom wall can be defined by a flexible wall material attached to the frame, and the flexible wall material in beneficial embodiments forms a pocket extending downward from the frame. The drive mechanism can be arranged to rotate both the frame and the container bottom wall. The container can include automated means for translating the container bottom vertically to vary the volume capacity of the container, for example, responsive to a sensed fill condition of the container. Such a sensed fill condition can be based upon the presence or absence of container contents at a specified height or position, as for example can be detected using an electronic photo-eye sensor, upon a sensed weight of the contents of the container, or any other suitable condition. Vertical translation of the container bottom wall can reshape a flexible material when used as container wall material so as to vary the volume capacity of the container, and/or can be caused by a screw drive, spring, pneumatic cylinder, linear actuator, rack and pinion apparatus, or other suitable mechanism, operably coupled to the container bottom wall.

In another embodiment, provided is an apparatus for handling manufactured articles that includes a rotating pack-off container according to the discussions above or elsewhere herein, and a feed device arranged to feed manufactured articles into the rotating pack-off container.

In another embodiment, provided is a method for handling manufactured articles that includes feeding manufactured articles into a rotating pack-off container as discussed above or elsewhere herein, and removing the manufactured articles from the rotating pack-off container as at least the container bottom of the pack-off container rotates.

In a further embodiment, provided is a container that includes a circumferential frame and an upstanding pole within an inner opening defined by the circumferential frame. A container bottom including a flexible wall material is supported between the circumferential frame and the pole, with at least a portion of the flexible wall material being translatable vertically to vary the volume capacity of the container. The flexible wall material can define a generally annular pocket between the circumferential frame and the pole, and the depth of the pocket can be varied by vertically translating a central portion of the wall material surrounding the pole.

In another embodiment, provided is a method for handling manufactured articles. The method includes conveying the manufactured articles into a rotating container, vertically translating at least a bottom wall of the rotating container so as to vary the volume capacity of the container, and removing the manufactured articles from the rotating container. In varied embodiments, the rotating container can have any or all of the features discussed hereinabove or below. In addition or alternatively, the method can include packing the removed manufactured articles into containers. The removing and packing steps can be performed manually. The method can also include electronically sensing a fill condition of the container, and automatically vertically translating at least the bottom wall of the rotating container to vary to vary the volume capacity of the container in response to the sensed fill condition.

Additional embodiments of the invention as well as features and advantages thereof will be apparent to those of ordinary skill in the art from the descriptions herein.

DETAILED DESCRIPTION

Figure 1:
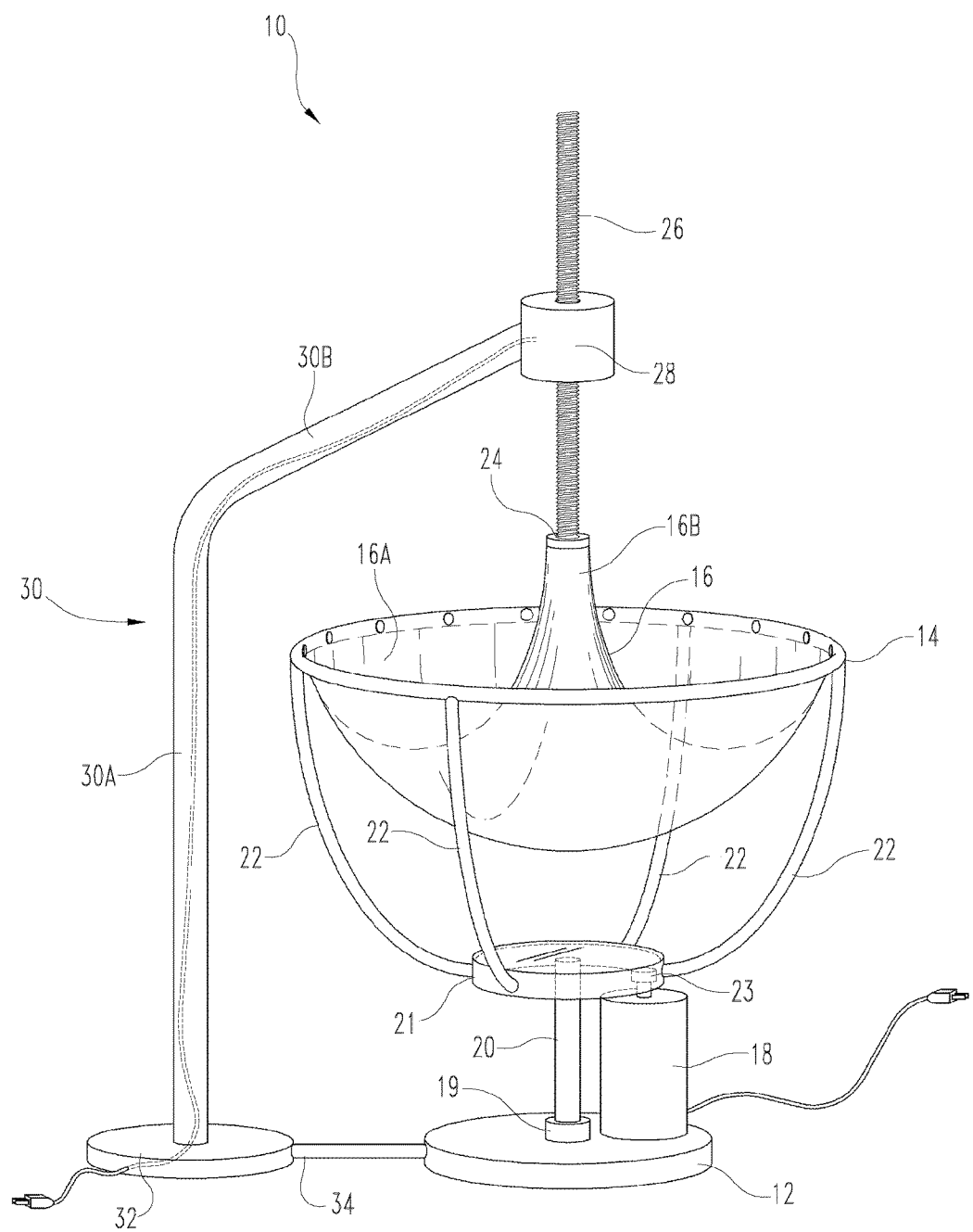
FIG. 1 provides a perspective view of one embodiment of a pack-off container in accordance with the invention.

For the purpose of promoting an understanding of the principles of the invention, reference will now be made to certain embodiments, some of which are illustrated in the drawings, and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As disclosed above, aspects of the present invention relate to novel pack-off containers that have the capacity to vary their volume for holding manufactured articles. With reference now to the figures, FIG. 1 provides a perspective view of one embodiment of a pack-off container apparatus 10. Apparatus 10 includes a base member 12 positionable on a support surface. Also provided is circumferential frame 14 and container bottom member 16. A motor drive 18 is provided and is operable to rotate at least the container bottom member 16 when energized, desirably in a generally horizontal plane such that manufactured articles supported by the container bottom member 16 also travel rotationally in a generally horizontal plane. Conventional electric motors, gear reduction drives when needed, and rotatable connections can be used in connection with motor drive 18. Illustratively, motor drive 18 can be coupled to a pole 20 rotatably supported on base member 12. This coupling can be through a drive sleeve 21 fixedly attached to pole 20, and a drive wheel 23 driven to rotate by motor drive 18 and frictionally engaging an inner surface of drive sleeve 21. Pole 20 can be rotatably supported on base member 12 for example by bearing sleeve 19. Motor drive 18, when energized, thereby causes rotation of pole 20. In the illustrated embodiment, a plurality of outwardly bowed frame struts 22 are connected to drive sleeve 21 at one end of struts 22 and to circumferential frame 14 at an opposite end of struts 22. Thus, rotation of pole 20 by motor drive 18 rotates struts 22 which in turn rotates circumferential frame 14. In the illustrated embodiment, container bottom member 16 includes a first portion 16B connected to a mechanism for vertically translating portion 16B, as discussed in more detailed below. Container bottom member 16 also includes a second portion 16A circumferentially attached to frame member 14, for example by snaps as depicted by the series of circular buttons located circumferentially around the inside of circumferential frame 14, or by ties, bonding, or any other suitable mechanism. Container bottom member 16 and any other flexible wall members discussed herein can be made of a flexible material, for example a flexible cloth material (e.g. canvas) or a flexible polymeric sheet material. In such cases, as illustrated, container bottom member 16 can form a concave upper support surface along at least a portion of container bottom member 16, for instance with container bottom member 16 forming a pocket or bowl that depends downwardly from circumferential frame 14. As will be discussed further hereinbelow, the downward movement or translation of portion 16B causes increased billowing of container bottom member 16 and thereby increases the volume capacity of container apparatus 10.

In the illustrated embodiment, portion 16B of container bottom member 16 is vertically translatable downward and upward by a screw drive. Specifically, portion 16B is circumferentially attached around bearing sleeve 24 by any suitable means or mechanism including for example clamps, ties, bonding, buttons or otherwise. Bearing sleeve 24 is in turn rotatably received around a vertically extending screw 26, such that sleeve 24 can rotate independently of screw 26. For these purposes, the lower region of screw 26 can have a smooth outer surface rather than bearing a thread pattern, to permit sleeve 24 to rotate about screw 26 without engaging or interference from threads. Screw 26 is received through a motor-driven drive 28, which can include a motor driven rotatable member or members such as a nut and/or recirculating balls that engage(s) the threads on screw 26 in such a fashion that operation of drive 28 can be used to drive the screw 26 upward or downward, depending on the direction of rotation of the nut/ball member(s). Accordingly, screw drive 28 can be operated to drive screw 26 upward or downward, which in turn drives sleeve 24 and portion 16B of container bottom member 16 upward or downward so as to vary the volume of container apparatus 10. Screw drive 28 is supported by mount 30 which includes a first vertically extending portion 30A and a portion 30B cantilevered therefrom and connected to drive 28. Mount 30 is supported by base member 32 which in turn can be connected to base member 12, e.g. by connector strut 34, which can be used to maintain the relative position of base member 12 and base member 32 to maintain a constant vertically aligned position of drive 28 and screw 26 over circumferential frame member 14, which vertically aligned position is optionally substantially in line with a central vertical axis of circumferential frame member 14.

Figure 2:
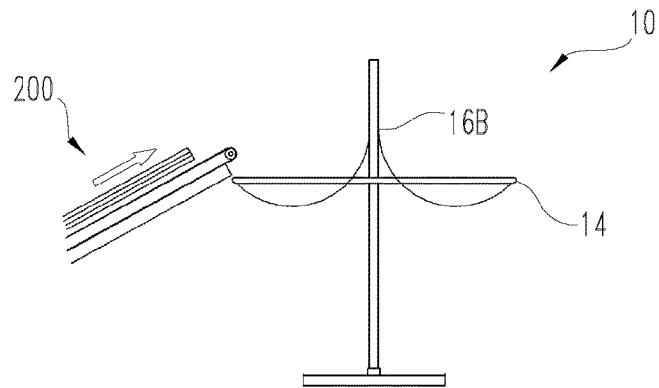
FIGS. 2-4 provide schematic views of the pack-off container of FIG. 1 at varying volume capacities.
Figure 3:
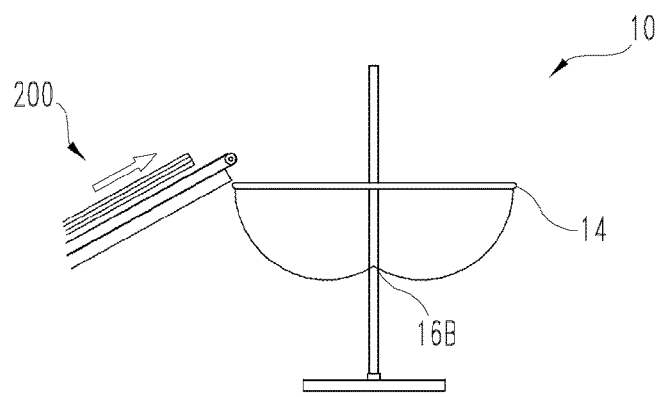
Figure 4:
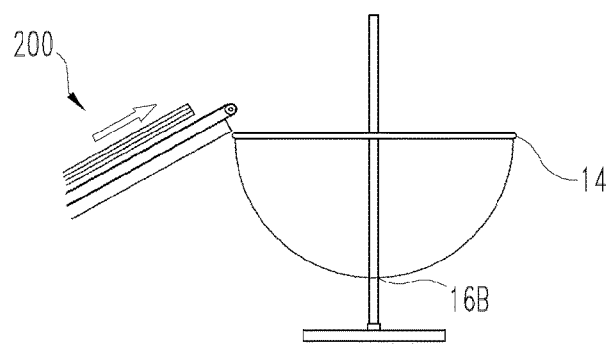

Shown in FIGS. 2-4 are various schematic views of the container apparatus 10 of FIG. 1, and particularly illustrating the frame member 14 and container bottom member 16 in various positions relative to one another as can be affected by the screw drive device or apparatus noted above. FIG. 2 shows apparatus 10 in a low-volume capacity configuration, where portions 16B of container bottom member 16 are held above an upper edge of frame 14. In this arrangement, portions of container bottom member 16 are positioned above frame 14, portions vertically coincide with frame 14, and portions extend below frame 14. Shown in FIG. 3 is a medium-volume capacity configuration of apparatus 10, where portion 16B has been lowered below a bottom edge of frame 14, and thus apart from any portion 16B of container member 16 that are connected to frame member 14, the entirety of the container bottom member 16 extends below frame 14. Shown in FIG. 4 is a full accumulation volume capacity configuration of apparatus 10, wherein again apart from any connecting portions to frame 14, the entirety of container bottom member 16 including portions 16B extends below frame 14. As will be understood, in these embodiments, container bottom member 16 forms a generally annular pocket between circumferential frame member 14 and screw 26, the shape and depth of which can be increased or decreased by operation of the screw drive. Also shown in FIGS. 2-4 is the association of container apparatus 10 with a conveyor 200 for conveying manufactured articles into container apparatus 10. It will be understood that similar conveyors can be associated with all other container embodiments described herein, and also all other container embodiments herein may attain positions of container bottom member 16 as described in conjunction with FIGS. 2-4.

Figure 5:
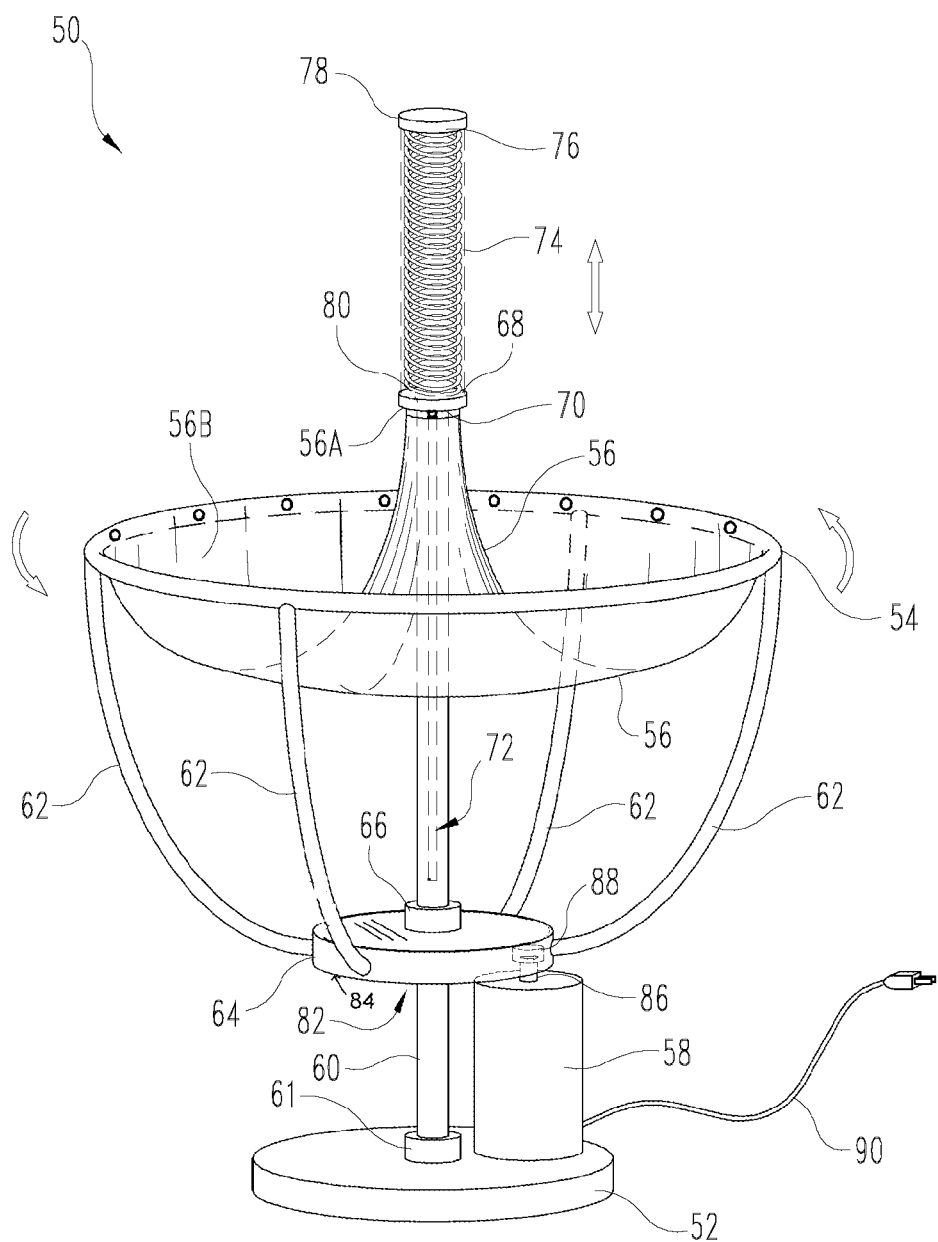
FIG. 5 provides a perspective view of another embodiment of a pack-off container in accordance with the invention.

With reference now to FIG. 5, shown is another embodiment of a variable-volume container apparatus 50 in accordance with the invention. Container apparatus 50 includes a base member 52 positionable against a support surface, such as a floor, and a circumferential frame member 54 supported by the base member 52. Apparatus 50 also includes a flexible container bottom member 56 supported within frame member 54, and a motor drive unit 58 for driving the rotation of container bottom member 56, as described in more detail below. Apparatus 50 also includes a central pole 60, which is rotatably connected to base member 52, for example by a sleeve or collar 61, which can be equipped with bearings or a low-friction surface residing against the external surface of pole 60 to facilitate the rotatable connection. A frame base 64 provided as a drive sleeve is fixedly or non-rotatably attached to pole 60, and a plurality of frame struts 62 extend from their attachment to frame base 64 to their attachment to frame member 54 at locations circumferentially around frame member 54. In this manner, pole 60 and the frame formed by circumferential frame member 54, struts 62 and frame base 64 rotate together. The attachments of frame portions to one another can be made by any suitable means including, for example, welding or the use of bolts, screws or other connecters.

Container bottom member 56 includes a first end portion 56A and a second end portion 56B. First end portion 56A is connected to support member 68, which is mounted on and vertically translatable relative to pole 60. Support member 68 can, as shown, be a collar or sleeve received around pole 60. First end portion 56A of bottom member 56 can be attached to support member 68 by any suitable mechanism, including, for instance, snaps, clamps, ties, connectors, etc. Support member 68 has a protuberance 70 that extends into groove 72 in pole 60, for example, in a tongue-and-groove fashion. The cooperation of protuberance 70 and groove 72 causes support member 68 to rotate along with pole 60 due to contact between edges of groove 72 and protuberance 70 when pole 60 is rotated. At the same time, protuberance 70 can ride vertically within groove 72 to maintain the vertically translatable arrangement of support member 68 upon pole 60. A spring 74, such as a coil spring, is provided having a first end 76 attached to cap 78, which in turn is fixedly attached to the top of pole 60. Spring 74 has a second end 80 attached to support member 68. In this manner, support member 68, and in turn container bottom member 56, are suspended from cap member 78 by spring 74, which is put into tension by the suspended weight of support member 68 and container bottom member 56, and the weight of any manufactured articles supported upon bottom member 56. Thus, the addition of manufactured articles of sufficient weight onto the upper surface of bottom member 56 will cause spring 74 to extend thereby lowering support member 68 and upper portion 56A of bottom member 56, which increases the container volume occurring below the upper edge of frame member 54 and increases the volume capacity of apparatus 50. Upon removal of manufactured articles of sufficient weight from the upper surface of bottom member 56, the spring 74 will retract, thereby decreasing the volume capacity of the apparatus occurring below the upper edge of frame member 54. The biasing force of spring 74 can be selected to be appropriately responsive to the weight of the manufactured articles to ensure that, as articles are added to or removed from the container apparatus 50, the volume capacity thereof adjusts to stably contain the articles and present them for removal, preferably at or near the vertical level of circumferential frame member 54.

The motor drive for rotation of the container apparatus 50 includes drive motor 58, which drives rotation through engagement with frame base 64. Frame base 64 is a hollow sleeve member defining a lower opening 82 and an inner wall surface 84. In the illustrated embodiment, the inner wall surface 84 defines a generally circular path, which is preferred. Drive motor 58 drives rotation of shaft 86 and friction wheel 88 attached to shaft 86. Friction wheel 88 frictionally contacts inner wall surface 84 such that rotation of wheel 88 drives rotation of frame base 64. This in turn rotates the struts 62 and frame member 54, as well as pole 60. The rotation of frame member 54 imparts rotation of container bottom 56 through its attachment to member 54. As well, the rotation of pole 60 rotates cap member 78, which causes rotation of spring 74 and suspended support member 68. The rotational force imparted to bottom member 56 via its attachment to frame member 54 can likewise be transmitted, through bottom member, to support member 68 and on to spring 74. Thus, in the specific container apparatus 50 illustrated, the pole 60, frame (elements 54, 62 and 64), bottom member 56, support member 68, spring 74 and cap 78, are all rotatable by energization of drive motor 58. In this regard, the energization of motor 58 can be provided from electrical grid power through an electrical power cord 90 electrically coupled to motor 58, as is well known. Other electrical power sources could also be used including, for example, one or more batteries or generators.

Figure 6:
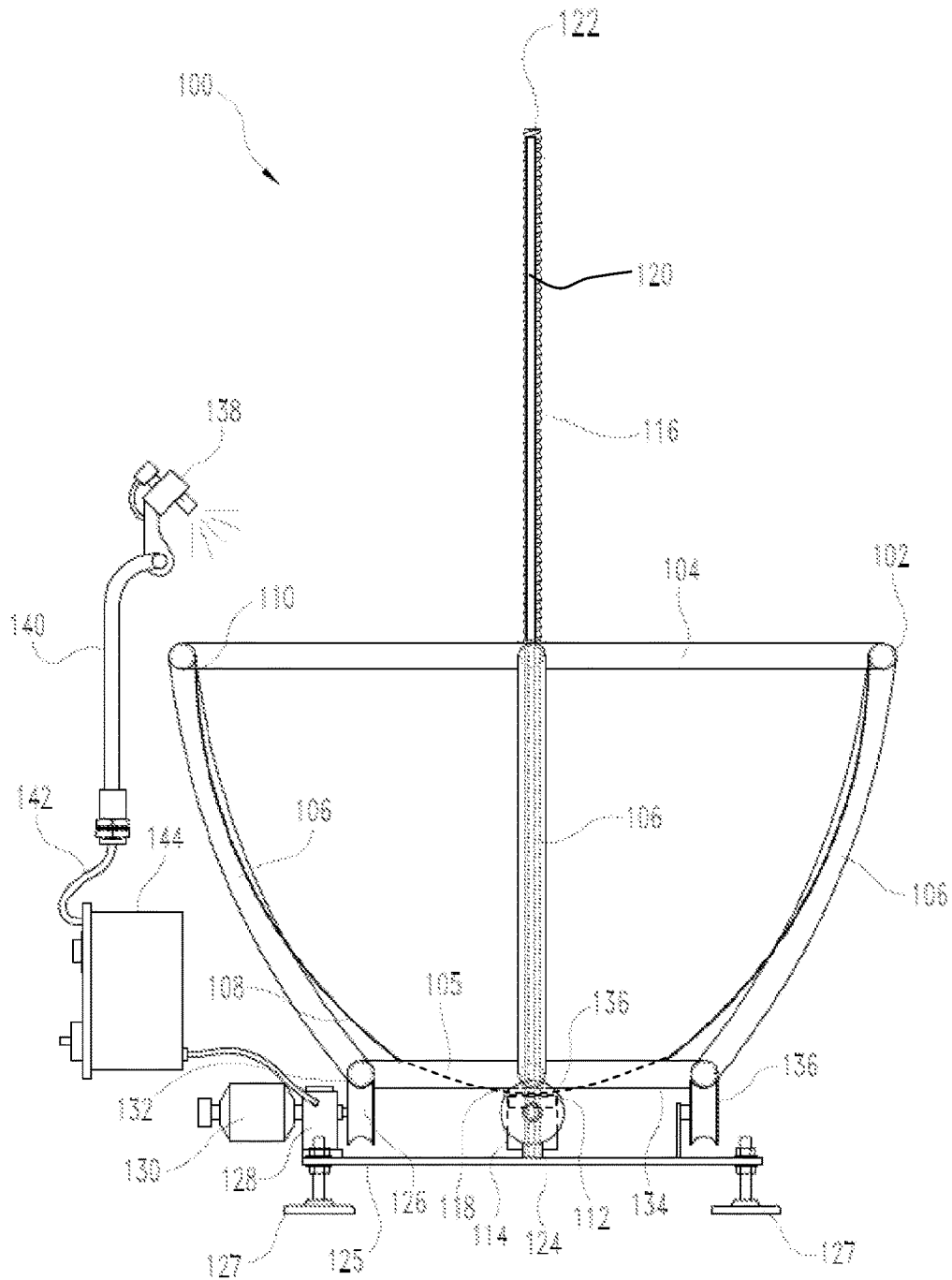
FIG. 6 provides a side view of another embodiment of a pack-off container in accordance with the invention.
Figure 7:
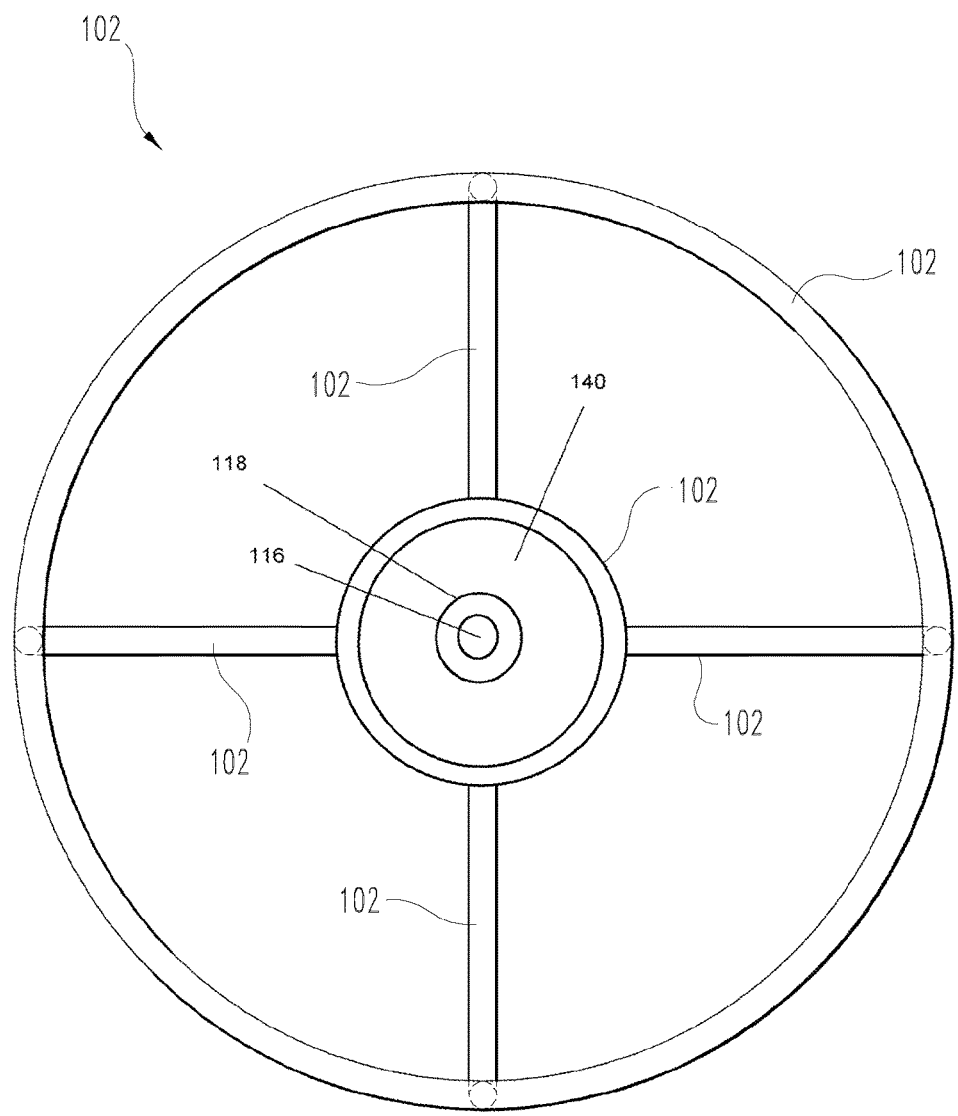
FIG. 7 provides a top view of the support frame and portions of a screw drive of the container of FIG. 6.

With reference now to FIGS. 6 and 7, shown is another embodiment of a pack-off container 100 in accordance with the invention. Pack-off container 100 includes a frame 102 having circumferential frame in the form of an upper hoop 104. Frame 102 also has a lower hoop 105. A plurality of outwardly bowed struts 106 are attached to hoop 104 and hoop 105. A generally bowl-shaped, rigid frame 102 is thereby constructed. Hoops 104 and 105 and struts 106 can, for example, be tubular members, such as extruded aluminum tubing. Connections between these frame components can be made in any suitable manner, including, for example, welding, bolts or other means.

Mounted within frame is flexible wall material 108. Wall material 108 is configured to form a pocket, desirably conformable to a generally bowl shape, and has an upper end 110 forming an open mouth attached to upper hoop 104, and flexible material depending or hanging downwardly from hoop 104 to a lower end 112 operably coupled to a vertically translatable carrier unit 114 of a screw drive.

Carrier unit 114 is received over an upstanding pole in the form of a threaded screw 116, as is typical in screw or worm drives. In the preferred embodiment shown, screw 116 is stationary (non-rotating), and carrier unit 114 includes a driven nut, optionally of a type with recirculating balls, and a motor to drive the nut. Such drives are known and can be used. These can include motors having internal bores for receipt around screw 116, and/or having rotors that are directly coupled to the rotating nut to provide simpler and more efficient constructions. A rotatable sleeve 118 is mounted to and above carrier unit 114, and is rotatable relative to carrier unit 114, for example, rotating on a bearing. The lower end 112 of flexible wall material 108 is attached to rotatable sleeve 118, and thus sleeve 118, flexible wall material 108 and frame 102 are rotatable together relative to carrier unit 114.

The motor and housing of carrier unit 114 are held in non-rotatable relationship relative to screw 116. For these purposes, screw 116 has a groove 120 extending along the length thereof, and the housing of carrier unit 114 defines a tongue that rides in groove 120. In the manner, as the driven nut and/or circulating ball components of carrier unit 114 rotate so as to engage the threads of screw 116 and thereby cause carrier unit 114 to travel upward or downward along screw 116, the motor and housing of carrier unit 114 are held against rotation around screw 116. The screw 116 has an upper end 122 at a height whereby when container 100 is at its minimum desired volume capacity, with carrier unit 114 in an elevated position on screw 116, bearing sleeve 118 is at or below the upper end 122 of screw 116. Screw 116 has a lower end 124 fixedly connected to a generally horizontal base member 125 which in turn is supported on legs 127. Legs 127 can be individually-height-adjustable, if desired, for leveling purposes. Frame 102 defines a central opening 140 through which screw 116 extends and which permits passage of carrier unit 114 and associated bearing sleeve 118. It will be understood that while a particular embodiment of a screw drive has been shown and described in conjunction with container 100, many screw drive devices are known and can be used, including, for example, those with rotating screws and stationary nuts, or with driven rotating nuts and stationary screws. As well, such systems may include guide components that run alongside the screw and that are attached to and prevent rotation of the nut (in a rotating screw drive) or of the nut housing (e.g. in a driven nut drive) during linear travel of the nut relative to the screw. For example, in a modification of the embodiment shown in FIGS. 6 and 7, instead of use of a tongue (on the carrier unit 114 housing) and groove (in the screw 116) arrangement to prevent rotation of the carrier unit 114 housing and motor during linear travel, carrier unit 114 housing could be fixedly coupled to a sleeve that rides non-rotatably up and down on a fixed, upstanding guidepost adjacent to screw 116. In this fashion, rotation of the motor and housing of carrier unit 114 would be prevented during driven linear travel of the carrier unit 114 up and down screw 116. These and other stabilizing arrangements used in association with screw drives will be apparent to those of skill in the pertinent art.

Container 100 also includes components for driving rotation of frame 102, flexible wall material 108, and sleeve 118. In the depicted embodiment, these components include a drive wheel 126 which is driven by motor 128 and associated gear reduction drive 130. Drive wheel 126 has an upper surface 132 that frictionally engages a lower surface 134 of lower hoop 105. In this fashion, as drive wheel 126 is driven to rotate, rotation is in turn imparted to frame 102, flexible wall material 108, and bearing sleeve 118. Container apparatus 100 also includes a plurality of additional, non-drive (idler) wheels 136, which rotatably supports lower hoop 105 and provides stability for frame 102 as it rotates. Any suitable number of idler wheels 136 can be provided, for example, including 2, 3, 4, 5 or more such wheels. Additionally, in alternative embodiments, any of these additional wheels or all of these additional wheels may be powered, for example by additional motors, if desired. Drive wheel 126 and idler wheels 136 define concave-shaped bearing surfaces for contact with hoop 105. For example, where hoop 105 is circular in cross section, the bearing surface of wheels 126 and 136 can be an arc of a circle that substantially conforms to the lower surface of hoop 105. So-called "U-groove" casters or wheels can be used for these purposes.

Container 100 also includes associated means for monitoring the level of fill of manufactured articles within flexible wall material 108 and for driving carrier unit 114, preferably automatically, upward or downward on screw 116 to adjust the volume capacity defined within flexible wall material 108. For these purposes, a photo-eye 138 is supported by mount 140 at a position to electronically view and assess the contents within flexible wall material 108. Photo-eye 138 is in communication with controller 144, for example, via a wired connection 142, or via a wireless connection. Controller 144 includes a computer processor for processing and responding to signals from photo-eye 138. Controller 144 is also in electronic communication, e.g. wired or wireless, with carrier unit 114 and in particular the motor thereof that drives the driven nut apparatus. When photo-eye 138 detects a fill condition exceeding the desired level in container 100, photo-eye 138 communicates a signal thereof to controller 144, which in turn drives the motor of carrier unit 114 to rotate in a first direction to lower carrier unit 114 along screw 116. This in turn lowers bearing sleeve 118 and the bottom end 112 of flexible wall material so as to increase the volume capacity defined by the flexible wall material 108. On the other hand, when photo-eye 138 detects a fill condition that is less than the desired level in container 100, photo-eye 138 communicates a signal thereof to controller 144, which in turn drives the motor of carrier unit 114 to rotate in a second direction (usually opposite to the first direction) to raise carrier unit 114. This in turn raises bearing sleeve 118 and the bottom end 112 of flexible wall material so as to decrease the volume capacity defined by the flexible wall material 108. In certain embodiments, this control action of photo-eye 138, controller 144 and carrier unit 114, is implemented to maintain the upper surface of the contents (e.g. manufactured articles) within flexible wall material 108 substantially at or near hoop 104 to support the contents at a level that is convenient for removal. If desired, controller 144 can also electronically communicate with motor 128, and can provide automated control or manual control (e.g. upon receiving manually input signals from a touchscreen or other input device) of the rate of rotation imparted to frame 102 and flexible wall material 108 by motor 128. Electrical power to controller 144, photo-eye 138, motor 130, and carrier unit 114 can be provided in any suitable manner, for example, by corded connection to grid power, battery, or other means. It will be understood that this and other fill-level monitors can be associated with any and all other container embodiments described herein.

With reference now to FIGS. 8-12, shown are additional alternative embodiments herein. The embodiments of FIGS. 8-12 share common features with the embodiments of FIG. 1 or 5, which are similarly numbered.

Figure 8:
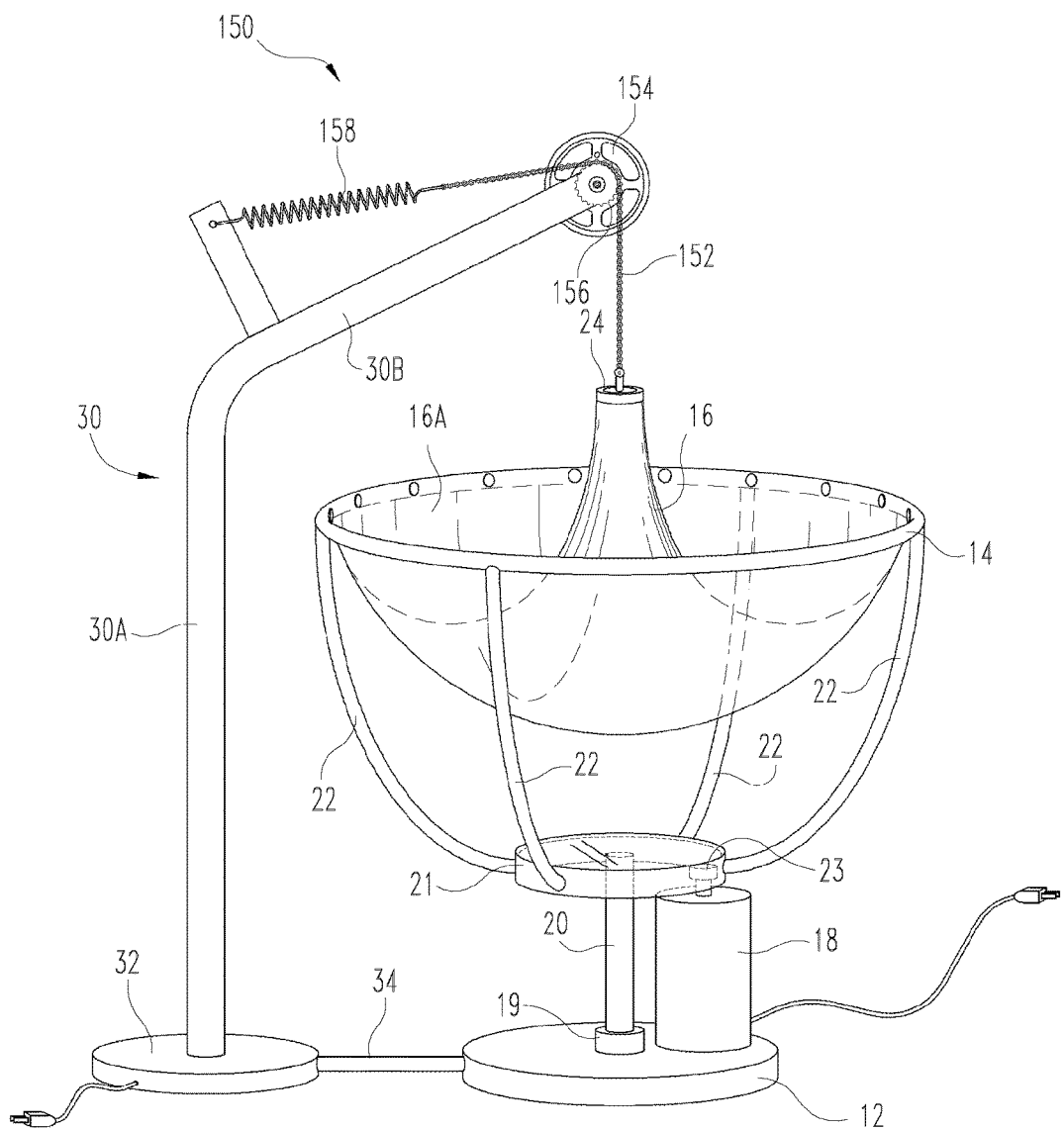
FIG. 8 provides a side view of another embodiment of a pack-off container in accordance with the invention.

Shown in FIG. 8 is an embodiment similar to that in FIG. 1, except wherein the screw drive container volume adjustment mechanism is replaced by a motor-driven chain mechanism. In particular, adjustable volume container 150 includes a chain 152, which can be a bicycle type chain, and a bi-directional motor 154 driving a gear 156 that meshes with the chain 152. In this fashion, motor 154 is operable to drive chain 152 in either direction, to raise or lower container bottom member 16 to adjust the volume of container 150. Chain 152 is connected to container bottom member 16 through rotatable bearing 24, such that bearing 24 and attached container bottom member 16 can rotate while chain 152 does not rotate. Container 150 also includes a slack take-up spring 158 connected to the chain 152 at an end opposite the bearing 24, to maintain tension on the chain 152 in order to take up any slack therein.

Figure 9:
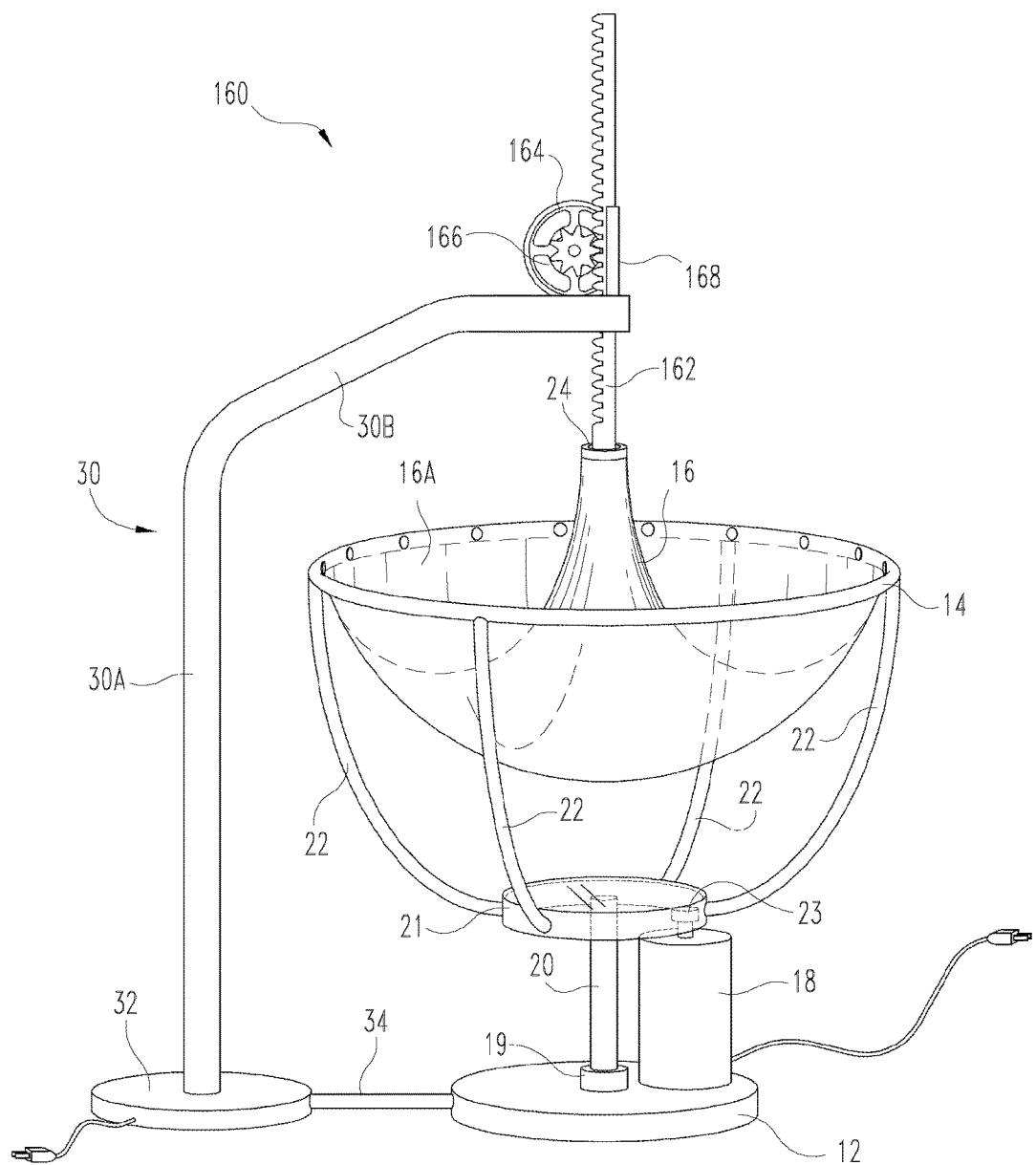
FIG. 9 provides a side view of another embodiment of a pack-off container in accordance with the invention.

Referring now to FIG. 9, shown is another container 160, similar to container 10 of FIG. 1, except wherein the volume adjustment mechanism is instead a rack and pinion arrangement. Thus, container 160 includes an elongate rack 162 operably associated with a bi-directional motor 164 and a pinion 166 which meshes with teeth on rack 162. Container 160 also includes a rack roller guide 168 which serves to guide the rack 162 during its upward and downward movement. Bidirectional motor 164 can be operated to rotate pinion 166 which in turn drives rack 162 upward or downward depending upon the direction of operation of motor 164. The upward and downward movement of rack 162 in turn drives the upward and downward movement of container bottom member 16. Rack 162 is connected to container bottom member 16 through rotatable bearing 24 such that bearing 24 and bottom member 16 can rotate while rack 162 does not rotate.

Figure 10:
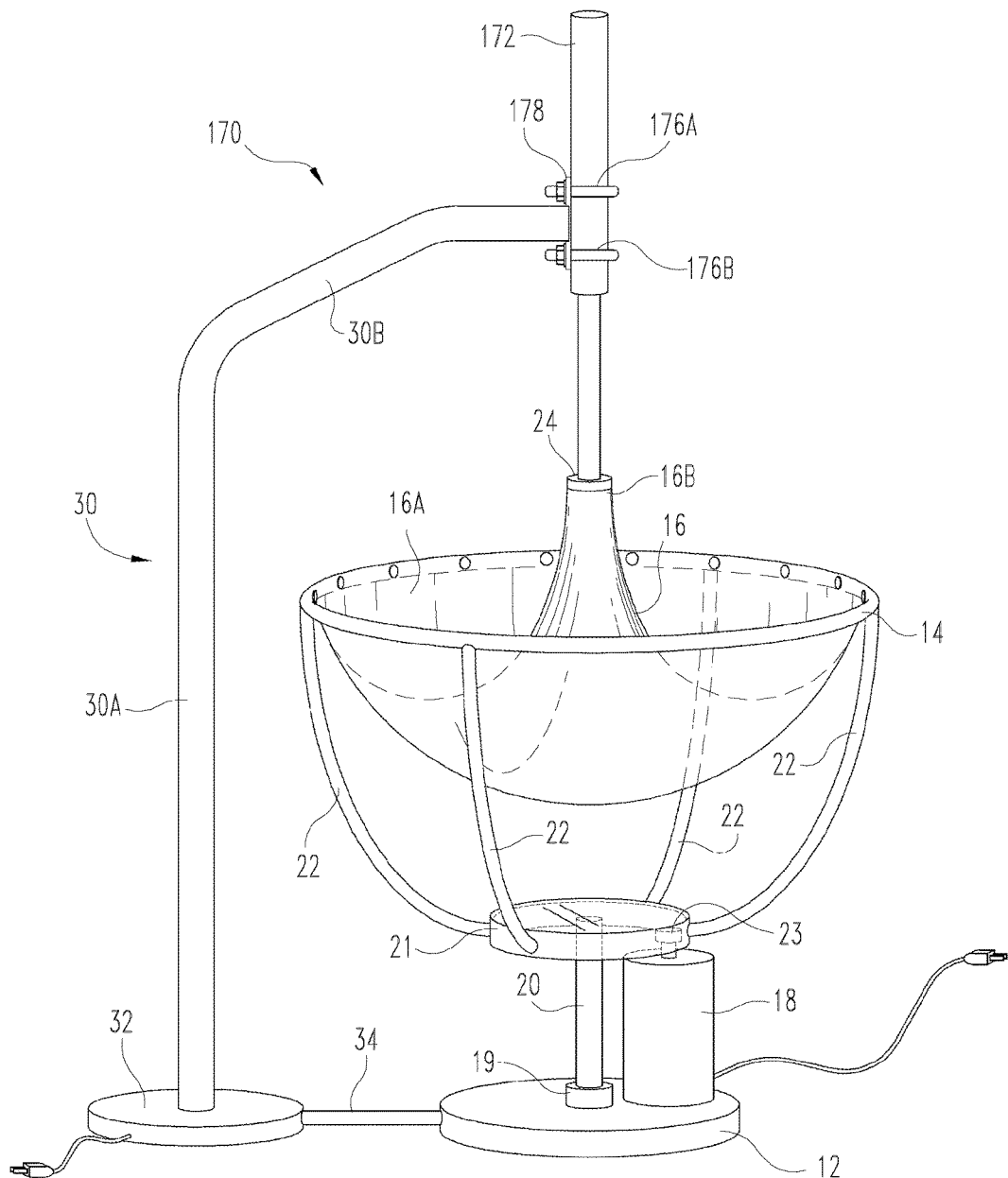
FIG. 10 provides a side view of another embodiment of a pack-off container in accordance with the invention.

With reference to FIG. 10, shown is still another container 170, also similar in respects to container 10 of FIG. 1. Container 170 utilizes a linear rod actuator 172 to drive the upward and downward movement of container bottom member 16 to adjust the volume of container 170. For these purposes, linear rod actuator 172 includes a rod 174. Linear rod actuator 172 is operable to drive rod 174 in an upward or downward direction. Rod 174 is connected to container bottom member 16 through bearing 24, such that bearing 24 and container bottom member 16 can rotate while actuator 172 and its associated rod 174 do not rotate. Linear rod actuator 172 is supported on mount 30 by suitable means such as U-clamps 176A and 176B, which can extend through a mount plate 178 of mount 30 and be affixed in place by wing nuts or other suitable connectors.

Figure 11:
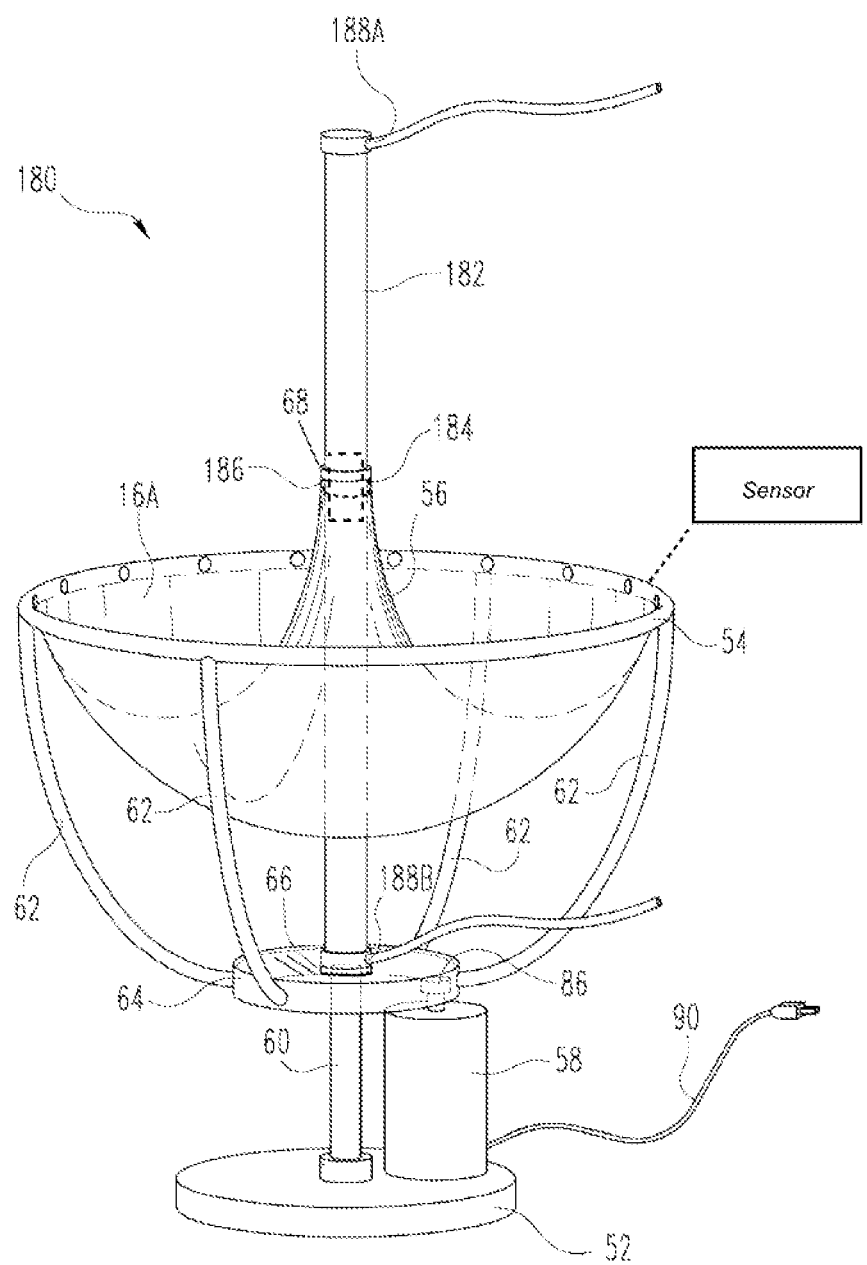
FIG. 11 provides a side view of another embodiment of a pack-off container in accordance with the invention.

FIG. 11 shows another embodiment of a container 180, similar in respects to container 50 of FIG. 5. Container 180 utilizes a rodless cylinder, preferably a magnetically coupled rodless cylinder, to drive the upward and downward movement of container bottom member 56. Suitable magnetically coupled rodless cylinders include, for example, the NCY3 Magnetically Coupled Rodless Cylinder available from SMC Corporation of America, Noblesville, Ind., USA, or similarly-designed cylinders. Rodless cylinder 182 includes a carriage 184 external of the cylinder 182 and coupled (e.g. magnetically coupled) to a piston 186 (represented by the rectangle in dotted lines) located within the cylinder 182 such that the carriage 184 and piston 186 travel together along the length of the cylinder. External carriage 184, shown in phantom by dotted lines since it resides beneath the upper portion of bottom member 56, is connected to container bottom member 56 through rotatable bearing 68, such that bearing 68 and bottom member 56 can rotate while rodless cylinder 182 and its associated carriage 184 and internal piston 186 do not rotate. Bearing 68 can be rotatably supported upon and ride with carriage 184 for these purposes. Rodless cylinder 182 includes a first air port 188A on a first end and a second air port 188B at a second opposite end. Pressure applied through air port 188A to moves piston 186 and associated carriage 184 downward, and pressure applied to air port 188B moves piston 186 and associated carriage 184 upward. Also, in container 180, the pole 60 is non-rotatably supported on the base 52, and supports the rodless cylinder mechanism 182 in a non-rotating manner. Accordingly, the drive sleeve 64 in this embodiment 180 is supported by pole 60 in a rotatable fashion, such that sleeve 64 and struts 62 and frame 54 supported thereby can rotate relative to pole 60 and relative to rodless cylinder 182. A bearing sleeve 66 or other suitable mechanism can be used for these purposes.

Figure 12:
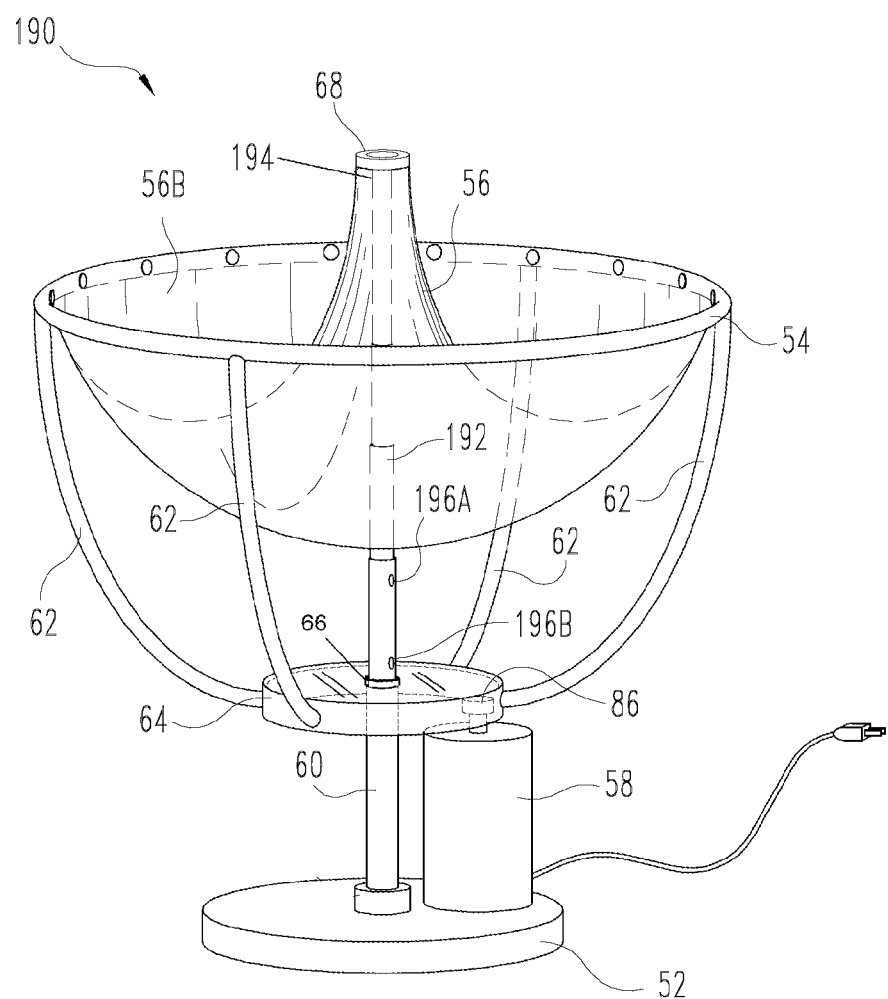
FIG. 12 provides a side view of another embodiment of a pack-off container in accordance with the invention.

With reference now FIG. 12, shown is another embodiment of a container 190, similar in respects to container 50 of FIG. 5. Container 190 includes a two-port telescoping pneumatic cylinder 192 for driving the upward and downward movement of container bottom member 16. Suitable telescoping pneumatic cylinders include, for example, ETHC telescoping pneumatic cylinders available from Ergo-Help Pneumatics, Arlington Heights, Ill., USA, or similarly-designed cylinders. Two-port telescoping pneumatic cylinder 192 includes a plurality of cylinder subcomponents or stages that can be received within one another in a retracted position of cylinder 192 and that telescope from one another in an extended position of cylinder 192. Cylinder 192 has an upper end 194 connected to container bottom member 56 through a rotating bearing 68, such that cylinder 192 does not rotate while bearing 68 and container bottom member 56 attached thereto rotate. Telescoping pneumatic cylinder 192 includes a first air port 196A and second air port 196B. Pressure can be applied through port 196A to extend cylinder 192, while vacuum or suction can be applied through port 196B to retract cylinder 192. In container 190, pole 60 is non-rotatably mounted upon base 52, and drive sleeve 64 is supported by and rotatably mounted relative to pole 60, which can for example be accomplished using bearing sleeve 66 or another suitable mechanism. Again, in this fashion, this enables the operation motor 58 to drive wheel 88 which in turn causes rotation of drive sleeve 64 and associated struts 62 and frame member 54. At the same time, pole 60 and telescoping pneumatic cylinder 192 do not rotate.

Figure 13:
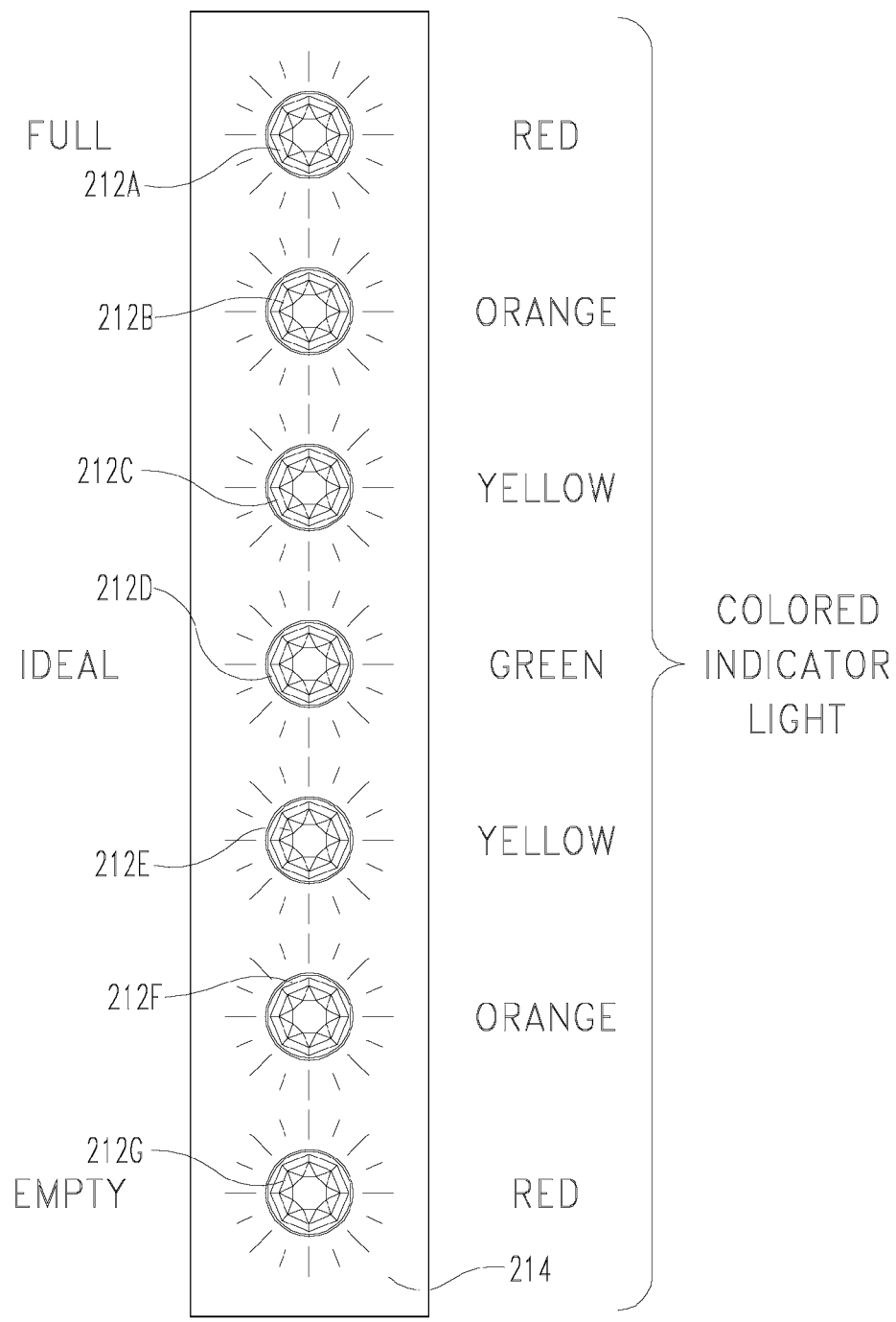
FIG. 13 provides a front view of a fill level gauge of the invention, and which can be used on or in conjunction with pack-off containers of the invention.

Shown in FIG. 13 is a volume gauge 210 that can be incorporated within or used in conjunction with any variable volume container herein, including but not limited to those depicted and described in conjunction with FIGS. 1-12. Gauge 210 can be located upon or close to such containers to provide a visible readout to users of the fill level of the container. For these purposes, readout can have a plurality of indicators 212A-G, such as lights (e.g. light emitting diodes), that are mounted on a display member 214 and can be selectively activated (e.g. energized) to indicate a fill level of the container. Illustratively, indicators 212A-G can be lights of different colors from one another, with each color indicating a certain fill level condition of the container. In some embodiments, a centrally-located indicator 212D can correspond to an ideal fill condition for the container, lights 212A-C to one side of such centrally located indicator 212D can indicate various levels of an over-fill condition, and lights 212E-G to another side of centrally located indicator 212D can indicate various levels of an under-fill condition or an empty condition. In certain variants, display member 214 can include visible indicia, such as text, to inform a user as to the significance of the lights or other selectively activatable indicators.

In certain embodiments described above, the vertical movement of the wall member of the containers is affected by screw drives, springs, linear actuators, motor-driven chains or rack and pinion arrangements, rodless cylinders, or telescoping pneumatic cylinders. In other embodiments, mechanisms other than those particularly shown or identified above are used to cause this vertical movement. These may, for example, include other rodless cylinders, other telescoping cylinders or poles, inflatable bladders, levers, belts, or any other suitable mechanism. In each case, the raise/lower mechanism can be associated with control means, such as a computer controller, operably coupled to a sensor (see e.g. "Sensor" of FIG. 11) that monitors the level of contents within the container. Signals from this sensor can be used to control the automatic adjustment of the volume of the container. Such sensors can be, for example, a photo-eye, a load cell arranged to detect the weight of the contents within the container, or any other suitable mechanism. As well, in other embodiments, the raise/lower mechanism to adjust the volume of the container can be manually operated by a user, for example, in response to viewing the fill level of the container or a readout indicator thereof.

It will also be understood that where an embodiment herein uses a flexible wall material, a variety of flexible materials can be used. These include cloth materials, polymeric sheet materials, and others. The flexible wall material is desirably sufficiently pliable that it can be reshaped between larger volume and smaller volume pockets, e.g. by lowering or raising, respectively, bottom-most portions of the pocket. Further, while flexible wall material is used in the specific embodiments depicted in the figures, and further forms both side and bottom wall portions of the container, it will be understood that other arrangements with flexible wall material, rigid wall material, or combinations thereof, can be used to define the volume capacity of the container, while allowing for selective increase or decrease of the volume capacity of the container preferably by vertical movement of at least the bottom wall portion of the container. All such embodiments are contemplated as being embraced by the broader aspects of the present invention.

As well, while specific frame designs are shown in the figures, others can be used within the scope of the invention. Frames can be conveniently constructed from materials that are desirably relatively rigid (e.g. as compared to a flexible wall material when used), with metals being suitable frame materials. Tubing, including metal tubing such as extruded aluminum tubing, is available commercially and can be used to construct the frame of any embodiment described herein.

Also, while specific arrangements are provided in the embodiments depicted above to drive rotation of the container wall and supported contents of the container, generally in a horizontal plane, other arrangements can be used and may involve the use of gears, belts or other conventional elements for imparting rotational movement from a powered drive source, such as a motor. For embodiments described herein, the rate of rotation of the container wall and contents can vary, with typical rates being in the range of about 1 to about 6 revolutions per minute.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

What is claimed is:

1. A rotating pack-off container for receiving manufactured articles, comprising:
   a circumferential frame;
   a container bottom wall supported in association with the circumferential frame, the container bottom wall arranged to support manufactured articles when residing in the container, and the container bottom wall translatable vertically to vary a volume capacity of the container;
   a drive mechanism arranged to rotate the container bottom wall so as to rotate manufactured articles when supported on the bottom wall;
   a central pole supported on a base, and wherein the container bottom is vertically translatably supported on the central pole; and
   wherein the container bottom comprises a flexible sheet material supported between the central pole and the circumferential frame.

2. The rotating pack-off container of claim 1, wherein the container bottom comprises a flexible sheet material attached to the frame, and wherein the drive mechanism comprises a motor drive that when energized is operable to rotate the frame and container bottom.

3. The rotating pack-off container of claim 1, also comprising automated means for translating the container bottom vertically relative to the frame to vary the volume capacity of the container.

4. The rotating pack-off container of claim 1, wherein the flexible sheet material has a first portion supported circumferentially around the central pole and a second portion supported circumferentially around the circumferential frame.

5. The rotating pack-off container of claim 4, wherein the first portion of the flexible sheet material is supported circumferentially around and rotatably around the central pole.

6. The rotating pack-off container of claim 5, wherein the first portion of the flexible sheet material is attached to a sleeve member having a central opening, wherein the pole extends through the central opening and the sleeve member is rotatable and vertically translatable relative to the pole.

7. The rotating pack-off container of claim 4, wherein the first portion of the flexible material is translatable in a vertical path from a first position on the pole to a second position on the pole lower than the first position, and wherein translation of the first portion of the flexible material in said vertical path increases the volume capacity of the container.

8. The rotating pack-off container of claim 4, wherein the flexible sheet material defines a concave upper surface between the central pole and the circumferential frame.

9. The rotating pack-off container of claim 1, wherein at least a portion of the upper surface of the container bottom is positioned below an upper edge of the circumferential frame.

10. The rotating pack-off container of claim 1, wherein the circumferential frame is generally circular in shape.

11. The rotating pack-off container of claim 1, wherein the circumferential frame comprises a hoop.

12. The rotating pack-off container of claim 1 wherein the drive mechanism is arranged to rotate the circumferential frame when energized.

13. The rotating pack-off container of claim 12, wherein the circumferential frame is attached to the container bottom, and wherein rotation of the circumferential frame causes rotation of the container bottom.

14. The rotating pack-off container of claim 1, wherein the container bottom is translatable vertically downwardly in response to increased weight supported on the container bottom.

15. The rotating pack-off container of claim 1, wherein the container bottom is translatable vertically downwardly manually or by motor drive.

16. The rotating pack-off container of claim 1, also comprising:
an electronic sensor for monitoring a level of manufactured articles in the container;
a controller in communication with the electronic sensor, and
a driven mechanism in communication with the controller and operable to translate the container bottom upwardly in response to a first signal from the controller and downwardly in response to a second signal from the controller.

17. The rotating pack-off container of claim 1, wherein the drive mechanism is arranged to rotate the container bottom wall in a generally horizontal plane so as to rotate manufactured articles when supported on the bottom wall in a generally horizontal plane.

18. The rotating pack-off container of claim 1, also comprising a visible fill gauge operable to provide a fill level indication for the container.

19. An apparatus for handling manufactured articles, comprising:
a rotating pack-off container according to claim 1; and
a feed device arranged to feed manufactured articles into the rotating pack-off container.

20. A method for handling manufactured articles, comprising:
feeding manufactured articles into a rotating pack-off container according to claim 1; and
removing the manufactured articles from the rotating pack-off container as at least the container bottom of the pack-off container rotates.

21. A container, comprising:
a circumferential frame defining an inner opening;
an upstanding pole positioned within the inner opening; and
a flexible wall material defining at least a container bottom suspended between the circumferential frame and the pole, with at least a portion of the flexible wall material translatable vertically to vary the volume capacity of the container; and wherein the flexible wall material has a first portion supported circumferentially around the pole and a second portion supported circumferentially around the circumferential frame; and
a drive mechanism arranged to rotate the container bottom so as to rotate manufactured articles when supported on the container bottom.

22. A method for handling manufactured articles, comprising:
conveying the manufactured articles into a container according to claim 21;
rotating the container bottom with the drive mechanism so as to rotate the manufactured articles supported on the container bottom;
vertically translating said at least a portion of the flexible wall material so as to vary the volume capacity of the container; and
removing the manufactured articles from the container.

23. The method of claim 22, wherein said vertically translating comprises operating a driven mechanism coupled to the bottom wall.

24. The method of claim 23, wherein the driven mechanism is selected from a screw drive, a linear drive, a telescoping pneumatic cylinder, a rodless pneumatic cylinder, a chain drive, a rack and pinion, and a linear rod actuator.

25. The method of claim 22, also comprising electronically sensing a fill level of the container, and wherein said vertically translating is in response to said electronically sensing.

26. A rotating pack-off container for receiving manufactured articles, comprising:
a circumferential frame;
a container bottom wall supported in association with the circumferential frame, the container bottom wall arranged to support manufactured articles when residing in the container, and the container bottom wall translatable vertically to vary a volume capacity of the container;
a drive mechanism arranged to rotate the container bottom wall so as to rotate manufactured articles when supported on the bottom wall; and
a driven mechanism operable to translate the container bottom upwardly and downwardly, wherein the driven mechanism is a magnetically coupled rodless pneumatic cylinder.

27. The rotating pack-off container of claim 26, wherein:
the container bottom wall comprises a flexible sheet material attached to the circumferential frame.

28. The rotating pack-off container of claim 27, also comprising:
an upstanding pole positioned within an inner opening defined by the circumferential frame; and
wherein the flexible sheet material is suspended between the circumferential frame and the pole.

29. The container of claim 21, also comprising automated means for translating the container bottom vertically relative to the frame to vary the volume capacity of the container.

* * * * *